US008415928B2

(12) United States Patent
Yang

(10) Patent No.: US 8,415,928 B2

(45) Date of Patent: Apr. 9, 2013

(54) POWER CIRCUIT

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/477,421

(22) Filed: Jun. 30, 2006

(65) Prior Publication Data

US 2008/0007304 A1 Jan. 10, 2008

(51) Int. Cl.
*H02J 7/00* (2006.01)

(52) U.S. Cl.
USPC .......................................... 320/137; 363/125

(58) Field of Classification Search .................... 363/34, 363/75, 76, 80, 125; 323/246, 266, 274, 323/300
See application file for complete search history.

(56) References Cited

U.S. PATENT DOCUMENTS

| | | | | | |
|---|---|---|---|---|---|
| 3,602,804 | A | * | 8/1971 | Randall | 323/246 |
| 3,921,058 | A | * | 11/1975 | Tanaka et al. | 323/300 |
| 4,710,699 | A | * | 12/1987 | Miyamoto | 323/324 |
| 4,791,545 | A | * | 12/1988 | Hinckley | 363/81 |
| 5,600,233 | A | * | 2/1997 | Warren et al. | 323/237 |
| 5,729,061 | A | * | 3/1998 | Narita | 307/130 |
| 5,932,938 | A | * | 8/1999 | Shimamori | 307/125 |
| 6,400,591 | B2 | * | 6/2002 | Reilly et al. | 363/125 |
| 6,519,163 | B1 | * | 2/2003 | Yoshimoto et al. | 363/21.01 |
| 6,894,471 | B2 | * | 5/2005 | Corva et al. | 323/282 |
| 6,917,185 | B2 | * | 7/2005 | Okamoto | 323/241 |
| 2001/0033505 | A1 | * | 10/2001 | Reilly et al. | 363/125 |
| 2003/0021134 | A1 | * | 1/2003 | Elferich et al. | 363/125 |
| 2003/0081440 | A1 | * | 5/2003 | Komatsu et al. | 363/132 |
| 2004/0218410 | A1 | * | 11/2004 | Yamada et al. | 363/125 |
| 2004/0240242 | A1 | * | 12/2004 | Chou | 363/125 |
| 2006/0072266 | A1 | * | 4/2006 | Yun | 361/90 |
| 2006/0186867 | A1 | * | 8/2006 | Kataoka | 323/282 |
| 2007/0205801 | A1 | * | 9/2007 | Perisetty | 326/26 |

* cited by examiner

*Primary Examiner* — Arun Williams

(74) *Attorney, Agent, or Firm* — Rosenberg, Klein & Lee

(57) ABSTRACT

The present invention provides a high efficiency power circuit. It includes an input transistor having a negative-threshold coupled to a voltage source for providing a supply voltage to the output terminal of the power circuit. An input detection circuit is coupled to the voltage source to generate a control signal when the voltage level of the voltage source is higher than a threshold voltage. A second transistor is coupled to the input detection circuit to turn off the input transistor in response to the control signal. An output detection circuit is connected to the supply voltage to generate a first enable signal when the voltage level of the supply voltage is higher than an output-over-voltage threshold. The first enable signal is used to switch off the input transistor. The output detection circuit generates a second enable signal when the voltage level of the supply voltage is lower than an output-under-voltage threshold. The second enable signal is used to turn off the output of the power circuit.

24 Claims, 5 Drawing Sheets

POWER CIRCUIT

BACKGROUND OF THE INVENTION

1. Field of the Invention

The present invention relates to a power converter. More particularly, the present invention relates to a power circuit.

2. Description of Related Art

FIG. 1 shows a traditional power supply for supplying a regulated voltage $V_Z$ from a line voltage $V_{AC}$. A rectifier circuit 10 is coupled to the line voltage $V_{AC}$ and provides the rectification to generate an input voltage $V_{IN}$. A capacitor 11 is connected from the input voltage $V_{IN}$ to a capacitor 15 to produce the regulated voltage $V_Z$. A zener diode 16 is connected to the capacitor 15 for the regulation. A resistor 12 is used for the discharge of the capacitor 11. This type of the power supply has been widely used in home appliances, such as coffee maker, cooling fan and remote controller, etc. However, the drawback of this type of the power supply is high power consumption, particularly for light load and no load situations. Both the resistor 12 and the zener diode 16 cause significant power losses. Therefore, reducing the power loss for power saving is requirement. The object of present invention is to provide a high efficiency power supply for both high load and light load conditions.

SUMMARY OF THE INVENTION

The present invention provides a power circuit includes an input transistor coupled to receive a voltage source, in which the input transistor is a negative-threshold device. A first transistor is connected in series with the input transistor to provide a supply voltage to the output terminal of the power circuit. An input detection circuit is coupled to the voltage source to generate a control signal in response to the voltage level of the voltage source. A second transistor coupled to the input detection circuit to turn off the input transistor and the first transistor in response to the control signal. An output detection circuit is coupled to the supply voltage to generate a first enable signal and a second enable signal in response to the voltage level of the supply voltage. A resistive device is connected to the input transistor and the first transistor to provide bias voltage to turn on the input transistor and the first transistor. The first enable signal is coupled to switch off the input transistor and the first transistor when the voltage level of the supply voltage is higher than an output-over-voltage threshold. The second enable signal is utilized to switch off the output of the power circuit when the voltage level of the supply voltage is lower than an output-under-voltage threshold.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

DETAILED DESCRIPTION OF THE INVENTION

Figure 1:
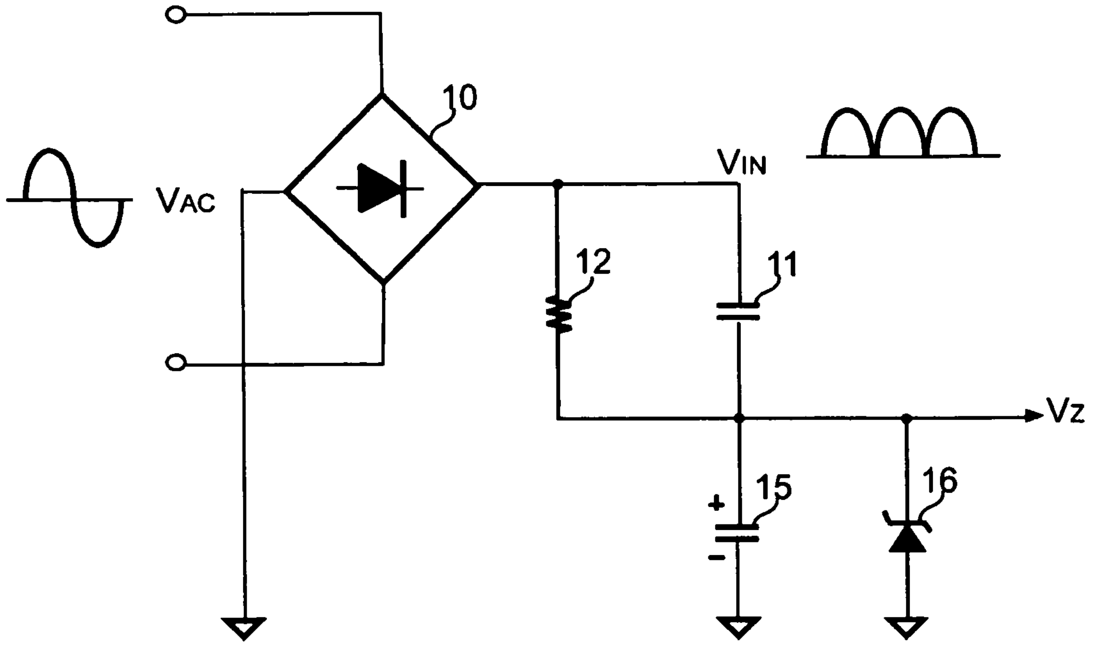
FIG.1(Prior Art)
FIG. 1 shows a circuit diagram of a traditional power supply.
Figure 2:
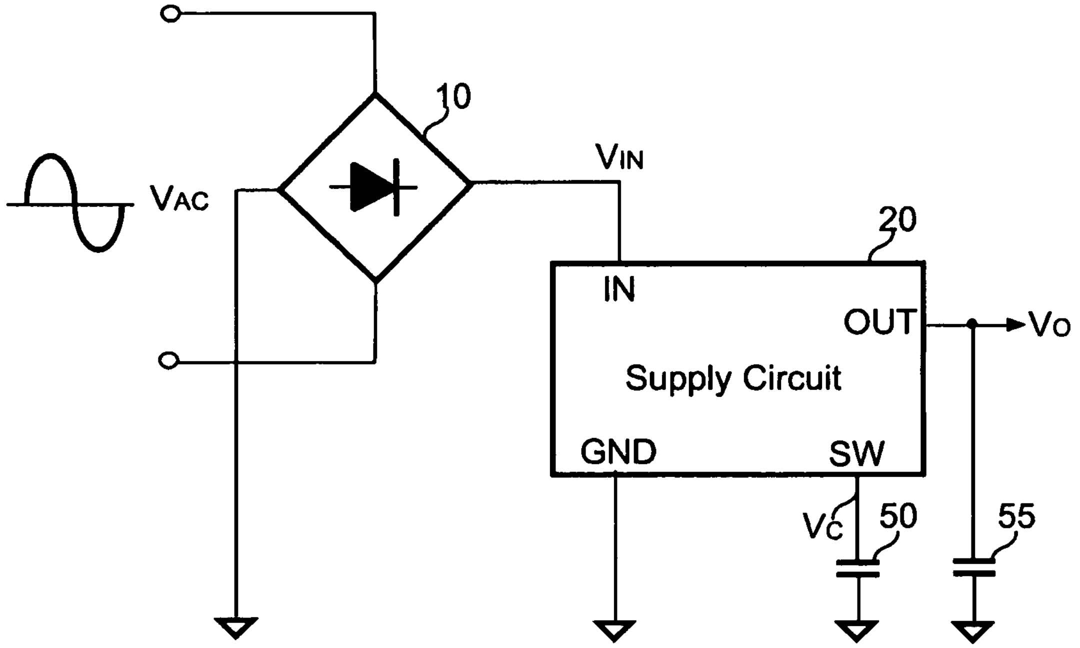
FIG. 2 shows a circuit diagram of a preferred embodiment of a power supply according to the present invention.

FIG. 2 shows a circuit diagram of a power supply according to the present invention. The rectifier circuit 10 receives the line voltage $V_{AC}$ to produce the input voltage $V_{IN}$ coupled to an input terminal IN of a supply circuit 20. The input voltage $V_{IN}$ is a voltage source and is rectified by the rectifier circuit 10. The supply circuit 20 will generate a supply voltage $V_C$ at a first output terminal SW, and generates an output voltage $V_O$ at a second output terminal OUT. A ground terminal GND of the supply circuit 20 is coupled to the ground. A capacitor 50 is connected to the first output terminal SW. Furthermore a capacitor 55 is connected to the second output terminal OUT for holding energy. The supply circuit 20 is also called a power circuit, a power supply circuit, a power regulation circuit or a power source circuit.

Figure 3:
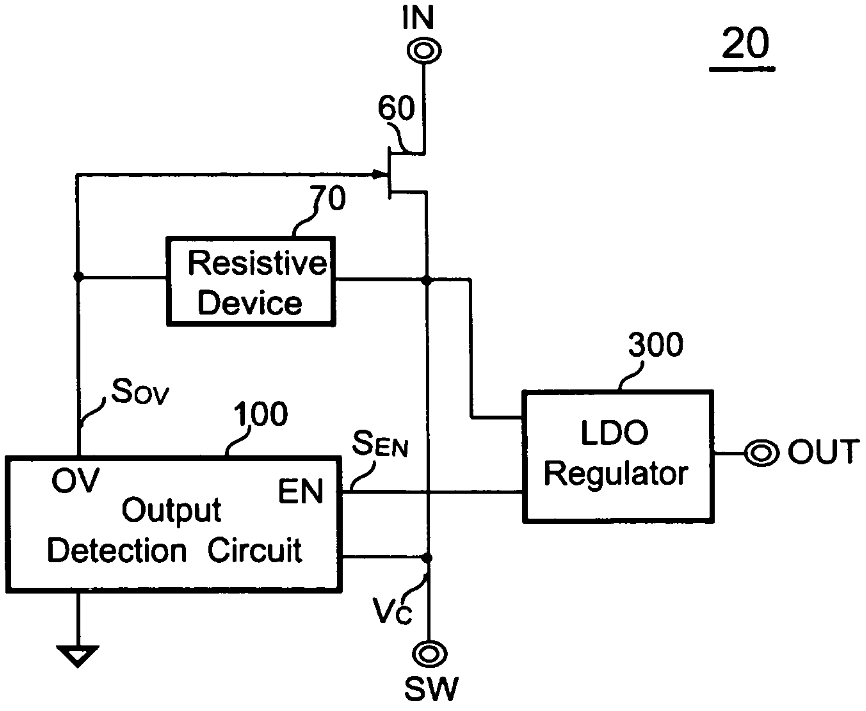
FIG. 3 shows a circuit diagram of a preferred embodiment of a supply circuit of the power supply according to the present invention.

FIG. 3 is a circuit diagram of a preferred embodiment of the supply circuit 20 of the power supply. The supply circuit 20 comprises an input transistor 60 coupled to the input terminal IN to receive the input voltage $V_{IN}$ for providing the supply voltage $V_C$ at the first output terminal SW. The input transistor 60 is a negative-threshold device, such as a JFET. A zero voltage bias will turn on the input transistor 60. The input transistor 60 can only be turned off by a negative bias voltage.

An output detection circuit 100 is coupled to the first output terminal SW to detect the supply voltage $V_C$ for generating a first enable signal $S_{OV}$ at a first enable terminal OV of the output detection circuit 100 in response to the voltage level of the supply voltage $V_C$. A resistive device 70 is connected to the input transistor 60 to provide bias voltage to turn on the input transistor 60. The resistive device 70 can be implemented by a resistor or a transistor. The first enable signal $S_{OV}$ is coupled to switch off the input transistor 60 when the voltage level of the supply voltage $V_C$ is higher than an output-over-voltage threshold. A LDO (Low Drop-Out) regulator 300 is coupled to the second output terminal OUT and generates the output voltage $V_O$. Besides, the output detection circuit 100 generates a second enable signal $S_{EN}$ at a second enable terminal EN of the output detection circuit 100 in response to the voltage level of the supply voltage $V_C$. The second enable signal $S_{EN}$ is connected to the LDO regulator 300 to switch off the output voltage $V_O$ of the supply circuit 20 when the voltage level of the supply voltage $V_C$ is lower than an output-under-voltage threshold.

Figure 4:
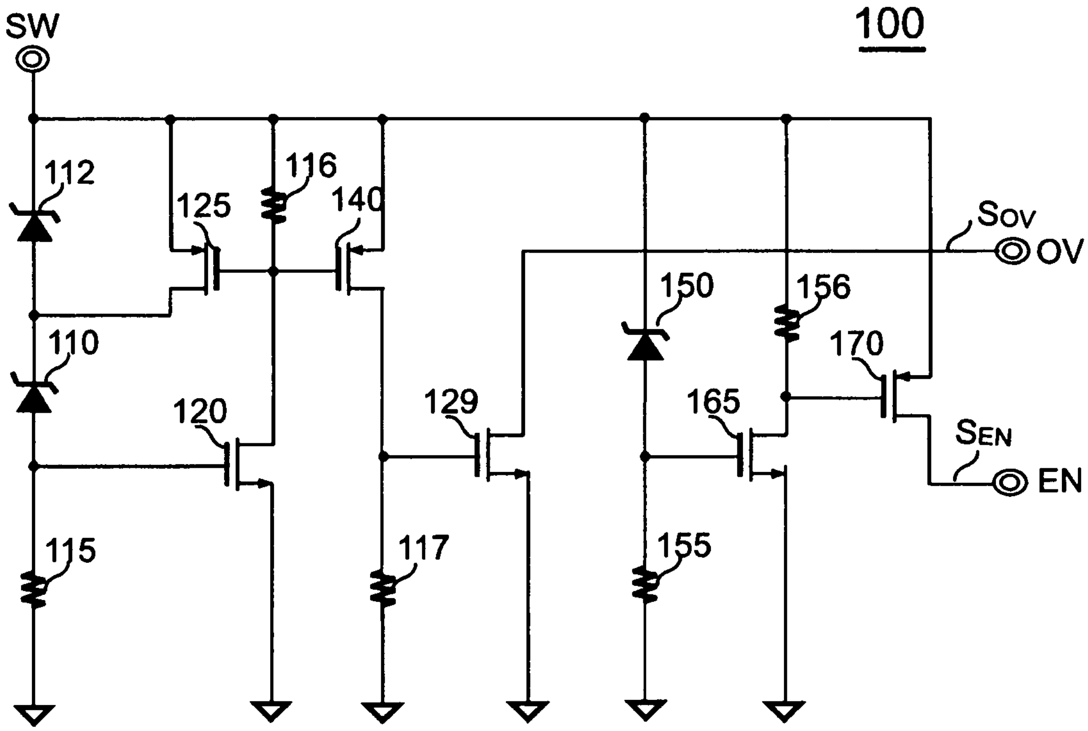
FIG. 4 shows a circuit diagram of a preferred embodiment of an output detection circuit of the supply circuit according to the present invention.

FIG. 4 shows a circuit diagram of a preferred embodiment of the output detection circuit 100. Zener diodes 110 and 112 are connected in serial. The zener diode 112 is further connected to the first output terminal SW to detect the supply voltage $V_C$. The zener diode 110 is connected to a resistor 115. The resistor 115 is further coupled to a transistor 120. The resistor 115 is used to turn on the transistor 120 when the voltage of the supply voltage $V_C$ is higher than the voltage of zener diodes 110 and 112. A transistor 125 is parallel connected with the zener diode 112 to short circuit the zener diode 112 when the transistor 120 is turned on, which achieve a hysteresis for detecting over-voltage of the supply voltage $V_C$. The zener voltage of the zener diodes 110 and 112 determines the output-over-voltage threshold. The zener voltage of the zener diode 112 determines a hysteresis threshold for the hysteresis. The first enable signal $S_{OV}$ will switch on the input transistor 60 when the voltage level of the supply voltage $V_C$ is lower than the hysteresis threshold.

A transistor 140 is coupled to the transistor 120 and the first output terminal SW. The transistor 140 is turned on in response to the turn-on of the transistor 120. A resistor 116 is coupled to the first output terminal SW, the transistors 125 and 140. The resistor 116 provides a bias to the transistors 125 and 140. A resistor 117 is connected to the transistor 140 to turn on a transistor 129 when the transistor 120 is turned on. The transistor 129 is further coupled to the transistor 140. The transistor 129 is further connected to the input transistor 60 and generates the first enable signal $S_{OV}$ to turn off the input transistor 60 once the voltage level of the supply voltage $V_C$ is higher than the output-over-voltage threshold.

A zener diode 150 is also connected to the first output terminal SW to detect the supply voltage $V_C$. A resistor 155 is connected to the zener diode 150 and a transistor 165 to turn on the transistor 165 once the voltage level of the supply voltage $V_C$ is higher than the output-under-voltage threshold. The zener voltage of the zener diode 150 determines the output-under-voltage threshold. A resistor 156 is coupled to the first output terminal SW and a transistor 170. The transistor 170 is further coupled to the first output terminal SW and the transistor 165. The transistor 170 generates the second enable signal $S_{EN}$ when the voltage level of the supply voltage $V_C$ is lower than the output-under-voltage threshold.

Figure 5:
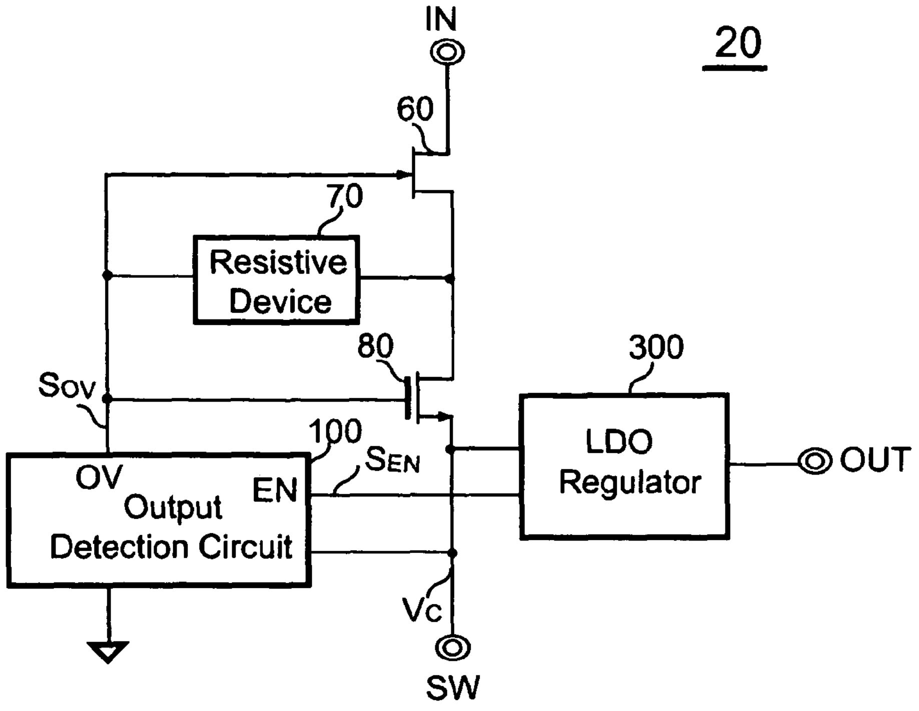
FIG. 5 shows a circuit diagram of another preferred embodiment of the supply circuit of the power supply according to the present invention.

FIG. 5 shows a circuit diagram of another preferred supply circuit 20, in which a first transistor 80 is connected in series with the input transistor 60 to provide the supply voltage $V_C$. The first transistor 80 is a positive-threshold device. The resistive device 70 is coupled to the input transistor 60 and the first transistor 80 to provide bias voltage to turn on the input transistor 60 and the first transistor 80. The first enable signal $S_{OV}$ is coupled to switch off the input transistor 60 and the first transistor 80 when the supply voltage $V_C$ is high than the output-over-voltage threshold. The first transistor 80 is equipped to provide a protection to the supply circuit 20. The first transistor 80 will be turned off to protection the input transistor 60 when the supply voltage $V_C$ is short-circuited.

Figure 6:
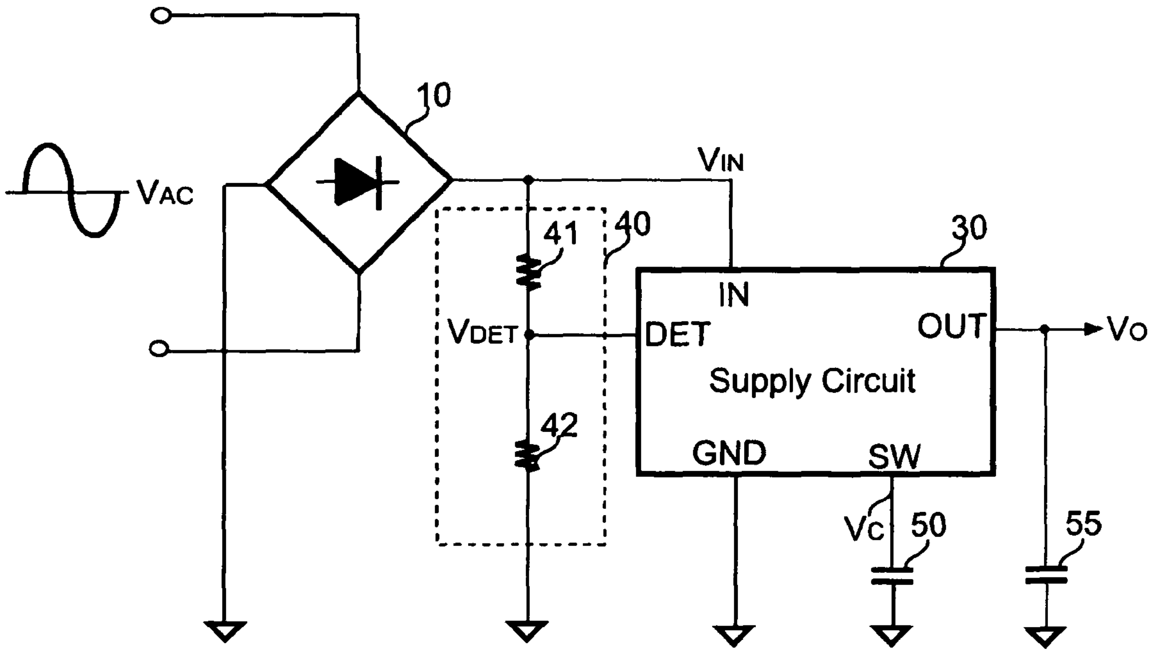
FIG. 6 shows a circuit diagram of another preferred embodiment of the power supply according to the present invention.
Figure 7:
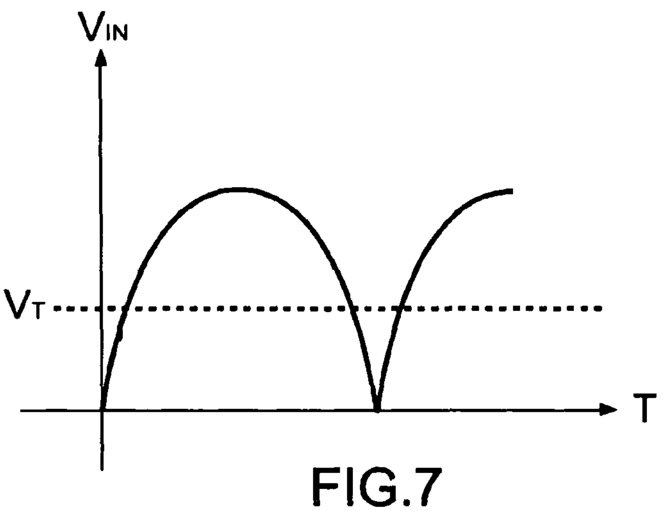
FIG. 7 shows the input voltage waveform of the power supply shown in FIG. 6 according to the present invention.

FIG. 6 shows a circuit diagram of another preferred embodiment of the power supply, in which the on/off of a supply circuit 30 coupled to the rectifier circuit 10 is synchronized with the line voltage $V_{AC}$. The supply circuit 30 is also called a power circuit, a power supply circuit, a power regulation circuit or a power source circuit. The supply circuit 30 can only be switched on when the input voltage $V_{IN}$ is lower than an input threshold voltage, which reduces the switching loss of the input transistor 60 and improves the efficiency of the supply circuit 30. FIG. 7 shows the waveform of the input voltage $V_{IN}$, in which the power of the input voltage $V_{IN}$ can be delivered to the first output terminal SW when the input voltage $V_{IN}$ is lower than the a threshold voltage $V_T$. The threshold voltage $V_T$ is correlated to the input threshold voltage. The supply circuit 30 includes a detection terminal DET coupled to the input voltage $V_{IN}$ through a voltage divider 40. The voltage divider 40 is coupled to the input voltage $V_{IN}$ and the detection terminal DET. The voltage divider 40 comprises resistors 41 and 42. The resistors 41 and 42 are coupled in series.

Figure 8:
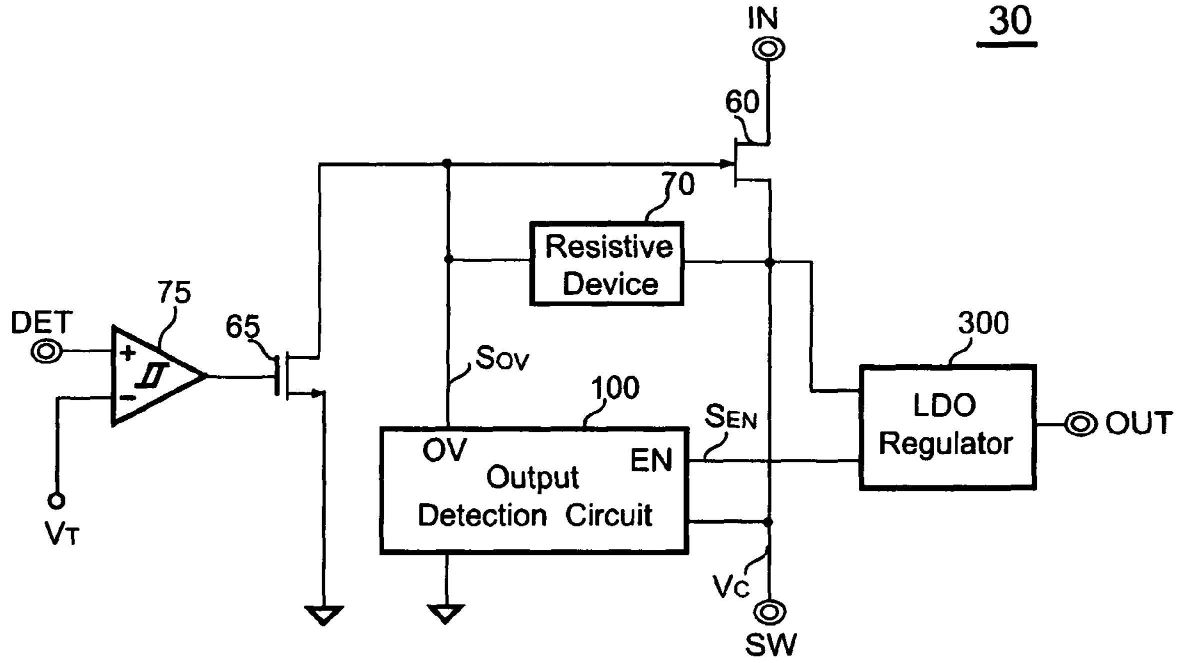
FIG. 8 shows a circuit diagram of a preferred embodiment of the supply circuit of the power supply shown in FIG. 6 according to the present invention.

FIG. 8 shows a preferred embodiment of the supply circuit 30 of the power supply shown in FIG. 6. The supply circuit 30 comprises the input transistor 60 coupled to the input terminal IN to receive the input voltage $V_{IN}$ for providing the supply voltage $V_C$ at the first output terminal SW. The input voltage $V_{IN}$ is the voltage source. A positive input terminal of an input detection circuit 75 is coupled to the detection terminal DET to detect the input voltage $V_{IN}$ via the voltage divider 40 and generates a control signal in response to the voltage level of the input voltage $V_{IN}$. The control signal is utilized to turn off the input transistor 60 through a second transistor 65 coupled between the input detection circuit 75 and the input transistor 60 when the voltage level of the input voltage $V_{IN}$ is higher than the threshold voltage $V_T$. The input detection circuit 75 includes the threshold voltage $V_T$ that is correlated to the input threshold voltage. The threshold voltage $V_T$ is coupled a negative input terminal of the input detection circuit 75.

The output detection circuit 100 is coupled to the first output terminal SW to detect the supply voltage $V_C$ and generates the first enable signal $S_{OV}$ at the first enable terminal OV in response to the voltage level of the supply voltage $V_C$. The circuit schematic of the output detection circuit 100 is also shown in FIG. 4. The resistive device 70 is connected to the input transistor 60 to provide bias voltage to turn on the input transistor 60. The first enable signal $S_{OV}$ is coupled to the input transistor 60 to switch off the input transistor 60 when the voltage level of the supply voltage $V_C$ is higher than the output-over-voltage threshold. Besides, the output detection circuit 100 generates the second enable signal $S_{EN}$ at the second enable terminal EN. The second enable signal $S_{EN}$ is connected to the LDO regulator 300 to switch off the output voltage $V_O$ of the supply circuit 30 when the voltage level of the supply voltage $V_C$ is lower than the output-under-voltage threshold. The LDO regulator 300 is coupled to the second output terminal OUT.

Figure 9:
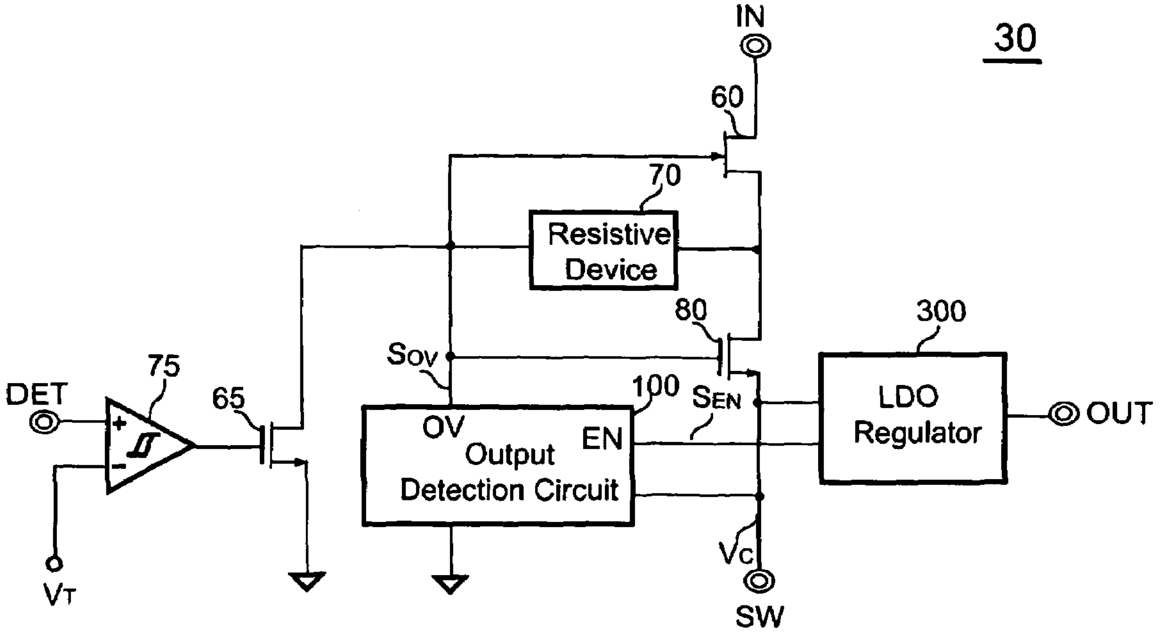
FIG. 9 shows a circuit diagram of another preferred embodiment of the supply circuit of the power supply shown in FIG. 6 according to the present invention

FIG. 9 shows another preferred embodiment of the supply circuit 30 of the power supply shown in FIG. 6. It includes the input transistor 60 coupled to the input terminal IN to receive the input voltage $V_{IN}$. The first transistor 80 is connected in series with the input transistor 60 to provide the supply voltage $V_C$. The positive input terminal of the input detection circuit 75 is coupled to the detection terminal DET to detect the input voltage $V_{IN}$ to generate the control signal in response to the voltage level of the input voltage $V_{IN}$. The input detection circuit 75 includes the threshold voltage $V_T$ coupled to the negative input terminal of the input detection circuit 75. The second transistor 65 is coupled to the input detection circuit 75, the input transistor 60 and the first transistor 80 to turn off the input transistor 60 and the first transistor 80 in response to the control signal. The input transistor 60 and the first transistor 80 are turned off when the voltage level of the input voltage $V_{IN}$ is higher than the threshold voltage $V_T$. The first transistor 80 and the second transistor 65 are positive-threshold devices.

The output detection circuit 100 is coupled to the supply voltage $V_C$ to generate the first enable signal $S_{OV}$ and the second enable signal $S_{EN}$ in response to the voltage level of the supply voltage $V_C$. The resistive device 70 is connected to the input transistor 60 and the first transistor 80 to provide bias voltage to turn on the input transistor 60 and the first transistor 80. The first enable signal $S_{OV}$ is coupled to the input transistor 60 and the first transistor 80 to switch off the input transistor 60 and the first transistor 80 when the voltage level of the supply voltage $V_C$ is higher than the output-over-voltage threshold. The second enable signal $S_{EN}$ is coupled to the LDO regulator 300 to turn on/off the output voltage $V_O$ of the supply circuit 30. The output voltage $V_O$ is switched off when the voltage level of the supply voltage $V_C$ is lower than the output-under-voltage threshold.

Figure 10:
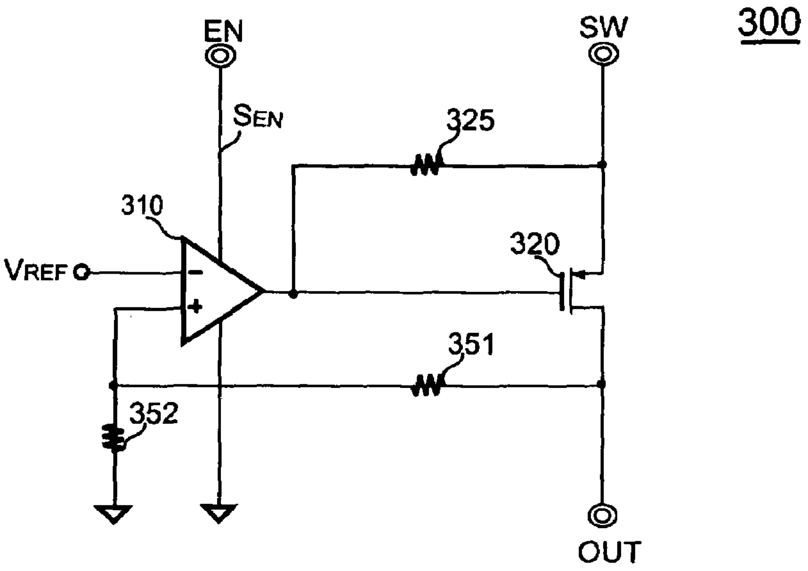
FIG. 10 shows a circuit diagram of a preferred embodiment of a LDO regulator of the supply circuit according to the present invention.

FIG. 10 shows a circuit diagram of the LDO regulator 300 that includes an operational amplifier 310, a pass element 320 and resistors 325, 351, 352. The operational amplifier 310 includes a reference voltage $V_{REF}$ coupled to a negative input terminal of the operational amplifier 310. The resistor 352 is coupled to a positive input terminal of the operational amplifier 310. The second enable signal $S_{EN}$ is coupled to the operational amplifier 310 to provide a power source for operating the operational amplifier 310. The pass element 320 is coupled to the operational amplifier 310, the first output terminal SW and the second output terminal OUT. The operational amplifier 310 and the pass element 320 are disabled once the second enable signal $S_{EN}$ is disabled. The resistor 351 is coupled to the positive input terminal of the operational amplifier 310 and the pass element 320. The resistor 325 is coupled to the pass element 320. The pass element 320 can be a transistor.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A power circuit, comprising:

an input transistor coupled to a voltage source;

a first transistor connected in series with the input transistor to provide a supply voltage;

an input detection circuit coupled to the voltage source to generate a control signal in response to the voltage level of the voltage source;

a second transistor coupled to the input detection circuit, the input transistor and the first transistor to turn off the input transistor and the first transistor in response to the control signal when the voltage level of the voltage source is higher than a threshold voltage;

an output detection circuit coupled to the supply voltage to generate a first enable signal and a second enable signal in response to the voltage level of the supply voltage; and a resistive device coupled to the input transistor and the first transistor to provide a bias voltage to turn on the input transistor and the first transistor;

wherein the first enable signal is coupled to the input transistor and the first transistor to switch off the input transistor and the first transistor when the voltage level of the supply voltage is higher than an output-over-voltage threshold, the second enable signal is utilized to turn off the output of the power circuit when the voltage level of the supply voltage is lower than an output-under-voltage threshold.

2. The power circuit as claimed in claim 1, wherein the input transistor is a negative-threshold device.

3. The power circuit as claimed in claim 1, wherein the first transistor and the second transistor are positive-threshold devices.

4. The power circuit as claimed in claim 1, wherein the input detection circuit is coupled to the voltage source through a voltage divider.

5. The power circuit as claimed in claim 1, wherein the resistive device can be implemented by a resistor or a transistor.

6. A power circuit, comprising:

an input transistor coupled to a voltage source and to provide a supply voltage;

an input detection circuit coupled to the voltage source to generate a control signal in response to the voltage level of the voltage source; and a resistive device coupled to the input transistor to provide a bias voltage to turn on the input transistor;

wherein the control signal is coupled to the input transistor to switch off the input transistor when the voltage level of the voltage source is higher than a threshold voltage.

7. The power circuit as claimed in claim 6, wherein the input transistor is a negative-threshold device.

8. The power circuit as claimed in claim 6, wherein the input detection circuit is coupled to the voltage source through a voltage divider.

9. The power circuit as claimed in claim 6, wherein the input detection circuit is further coupled a second transistor, the second transistor is coupled to the input transistor to turn off the input transistor in response to the control signal.

10. The power circuit as claimed in claim 6, further comprises an output detection circuit, the output detection circuit is coupled to the supply voltage to generate a first enable signal in response to the voltage level of the supply voltage, the first enable signal is coupled to the input transistor to switch off the input transistor when the voltage level of the supply voltage is higher than an output-over-voltage threshold.

11. The power circuit as claimed in claim 10, wherein the output detection circuit further generates a second enable signal in response to the voltage level of the supply voltage, the second enable signal is used to switch off the output of the power circuit when the voltage level of the supply voltage is lower than an output-under-voltage threshold.

12. A power circuit, comprising:

an input transistor coupled to a voltage source;

a first transistor connected in series with the input transistor to provide a supply voltage;

an output detection circuit coupled to the supply voltage to generate a first enable signal in response to the voltage level of the supply voltage; and a resistive device coupled between two terminals of the input transistor and between two terminals of the first transistor to provide a bias voltage to turn on the input transistor and the first transistor;

wherein the first enable signal is coupled to the input transistor and the first transistor to switch off the input transistor and the first transistor when the voltage level of the supply voltage is higher than an output-over-voltage threshold.

13. The power circuit as claimed in claim 12, wherein the input transistor is a negative-threshold device.

14. The power circuit as claimed in claim 12, wherein the output detection circuit further generates a second enable signal in response to the voltage level of the supply voltage, the second enable signal is used to switch off the output of the power circuit when the voltage level of the supply voltage is lower than an output-under-voltage threshold.

15. The power circuit as claimed in claim 12, wherein the first transistor is a positive-threshold device.

16. A power circuit, comprising:

an input transistor coupled to a voltage source and to provide a supply voltage;

an output detection circuit coupled to the supply voltage to generate a first enable signal in response to the voltage level of the supply voltage; and a resistive device coupled between two terminals of the input transistor and providing a bias voltage to turn on the input transistor;

wherein the first enable signal directly switches off the input transistor when the voltage level of the supply voltage is higher than an output-over-voltage threshold.

17. The power circuit as claimed in claim 16, wherein the input transistor is a negative-threshold device.

18. The power circuit as claimed in claim 16, wherein the output detection circuit further generates a second enable signal in response to the voltage level of the supply voltage, the second enable signal is used to switch off the output of the power circuit when the voltage level of the supply voltage is lower than an output-under-voltage threshold.

19. A power circuit, comprising:

an input transistor coupled to a voltage source and to provide a supply voltage; and an output detection circuit coupled to the supply voltage to generate a first enable signal in response to the voltage level of the supply voltage;

wherein the first enable signal directly switches off the input transistor when the voltage level of the supply voltage is higher than an output-over-voltage threshold.

20. The power circuit as claimed in claim 19, wherein the first enable signal will switch on the input transistor when the voltage level of the supply voltage is lower than a hysteresis threshold.

21. The power circuit as claimed in claim 19, wherein the output detection circuit further generates a second enable signal in response to the voltage level of the supply voltage, the second enable signal is used to switch off the output of the power circuit when the voltage level of the supply voltage is lower than an output-under-voltage threshold.

22. A power circuit, the improvement comprising:

an input transistor receiving a voltage source;

a first transistor providing a supply voltage in response to the voltage source from the input transistor;

an input detection circuit generating a control signal in response to the voltage level of the voltage source;

a second transistor turning off the input transistor and the first transistor in response to the control signal when the voltage level of the voltage source is higher than a threshold voltage;

an output detection circuit generating a first enable signal and a second enable signal in response to the voltage level of the supply voltage; and a resistive device providing a bias voltage to turn on the input transistor and the first transistor;

wherein the first enable signal switches off the input transistor and the first transistor when the voltage level of the supply voltage is higher than an output-over-voltage threshold, the second enable signal turns on/off the output of the power circuit.

23. A power circuit, the improvement comprising:

an input transistor providing a supply voltage in response to a voltage source;

an input detection circuit generating a control signal in response to the voltage level of the voltage source; and a resistive device coupled between two terminals of the input transistor and providing a bias voltage to turn on the input transistor;

wherein the control signal switches off the input transistor when the voltage level of the voltage source is higher than a threshold voltage.

24. A power circuit, the improvement comprising:

an input transistor providing a supply voltage in response to a voltage source; and an output detection circuit generating a first enable signal in response to the voltage level of the supply voltage;

wherein the first enable signal directly switches off the input transistor when the voltage level of the supply voltage is higher than an output-over-voltage threshold.

* * * * *